(12) United States Patent
Rebhan

(10) Patent No.: US 9,463,806 B2
(45) Date of Patent: Oct. 11, 2016

(54) CONSISTENT BEHAVIOR GENERATION OF A PREDICTIVE ADVANCED DRIVER ASSISTANT SYSTEM

(71) Applicant: HONDA RESEARCH INSTITUTE EUROPE GMBH, Offenbach/Main (DE)

(72) Inventor: Sven Rebhan, Offenbach (DE)

(73) Assignee: HONDA RESEARCH INSTITUTE EUROPE GMBH, Offenbach am Main (DE)

( * ) Notice: Subject to any disclaimer, the term of this patent is extended or adjusted under 35 U.S.C. 154(b) by 99 days.

(21) Appl. No.: 14/462,771

(22) Filed: Aug. 19, 2014

(65) Prior Publication Data

US 2015/0057907 A1   Feb. 26, 2015

(30) Foreign Application Priority Data

Aug. 22, 2013   (EP) .................................. 13181312

(51) Int. Cl.
*B60W 30/14* (2006.01)
*B60W 50/00* (2006.01)
(Continued)

(52) U.S. Cl.
CPC ............. *B60W 50/0097* (2013.01); *B60T 7/12* (2013.01); *B60T 7/22* (2013.01); *B60W 30/095* (2013.01); *B60W 30/143* (2013.01); *B60W 50/06* (2013.01); *B60T 2201/024* (2013.01);
(Continued)

(58) Field of Classification Search
CPC ...... B60T 7/12; B60T 7/22; B60T 2201/024; B60W 30/095; B60W 30/143; B60W 50/0079; B60W 50/06; B60W 2050/0056; B60W 2550/302; B60W 2550/308
USPC .................................................. 701/1, 70, 93
See application file for complete search history.

(56) References Cited

U.S. PATENT DOCUMENTS 5,463,384 A * 10/1995 Juds ....................... B60Q 9/008
                                                340/435
6,171,276 B1 * 1/2001 Lippe ...................... A61M 5/20
                                                128/DIG. 1

(Continued)

FOREIGN PATENT DOCUMENTS

DE    101 18 707 A1   10/2002
DE    102 58 617 A1    4/2004

(Continued)

OTHER PUBLICATIONS

European Search Report dated Jan. 22, 2014 corresponding to European Patent Application No. 13181312.3.

*Primary Examiner* — Atul Trivedi
(74) *Attorney, Agent, or Firm* — Squire Patton Boggs (US) LLP

(57) ABSTRACT

The invention relates to a driver assistance system for a vehicle, the vehicle comprising at least one sensor means, at least one actuating means and a control means. The method comprises the steps of generating a decision signal by a first evaluation of sensor data acquired by the sensor means, generating an activation signal for the actuating means when the decision signal exceeds a signal threshold, generating a interrupt decision signal based on a second evaluation, stabilizing the activation signal in a temporal manner, deciding based on the decision interrupt signal if to interrupt stabilizing the activation signal, and interrupting stabilizing the activation signal, when it is decided to interrupt stabilizing the activation signal.

21 Claims, 4 Drawing Sheets

Figure 1:
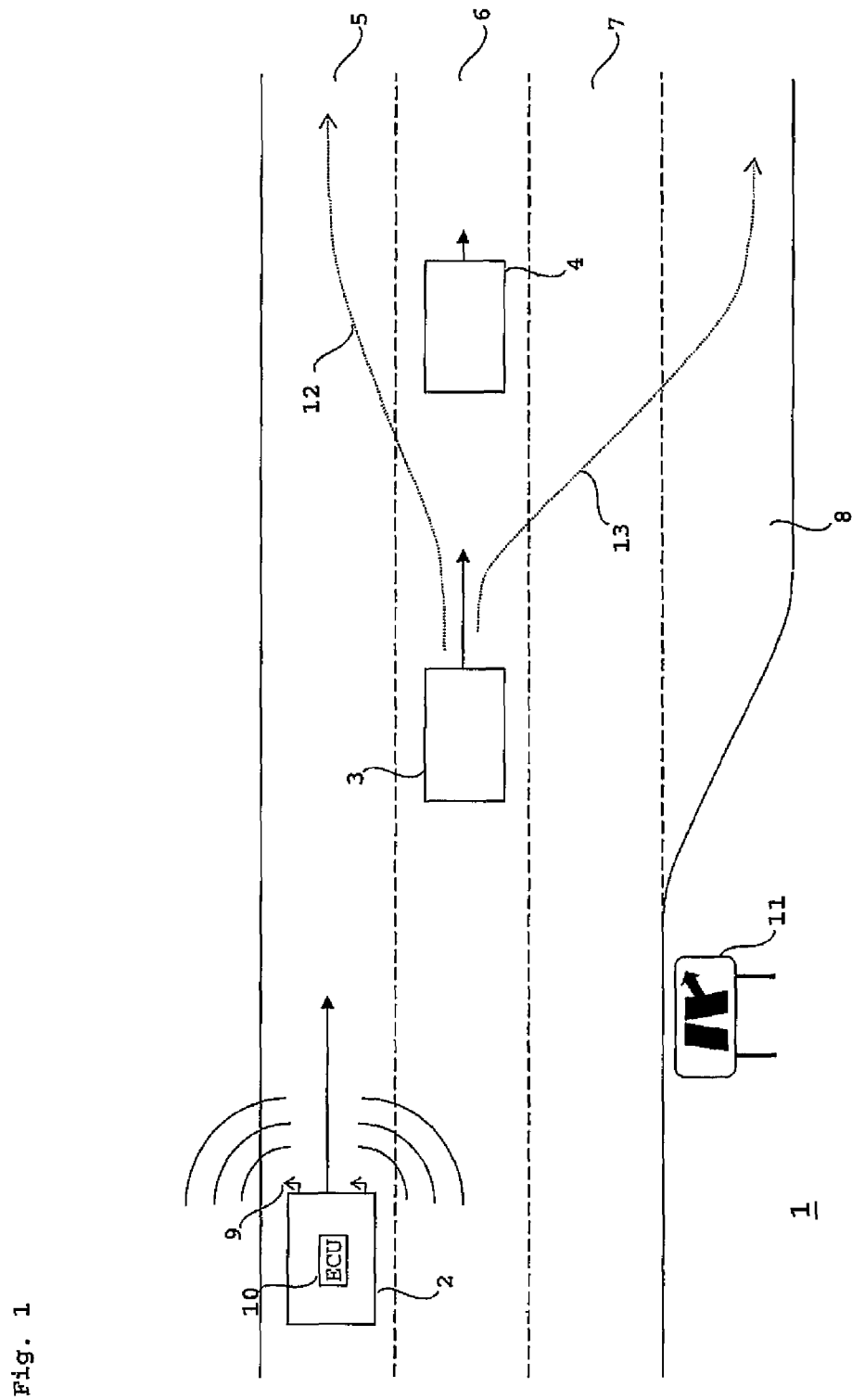

(51) Int. Cl.
   *B60T 7/12*      (2006.01)
   *B60W 50/06*     (2006.01)
   *B60T 7/22*      (2006.01)
   *B60W 30/095*    (2012.01)

(52) U.S. Cl.
   CPC .............. *B60W 2050/0056* (2013.01); *B60W 2550/302* (2013.01); *B60W 2550/308* (2013.01)

(56) References Cited

U.S. PATENT DOCUMENTS

| | | | |
|---|---|---|---|
| 6,985,805 B2* | 1/2006 | Sudou ................ | B60K 31/0008 180/170 |
| 7,424,357 B2* | 9/2008 | Ozaki ................ | B60T 8/17557 340/903 |
| 2004/0153217 A1 | 8/2004 | Mattes et al. | |
| 2004/0158377 A1* | 8/2004 | Matsumoto ......... | B60T 8/17557 701/48 |
| 2005/0273218 A1* | 12/2005 | Breed .............. | B60C 11/24 701/2 |
| 2006/0180371 A1* | 8/2006 | Breed .............. | G07C 5/008 180/197 |
| 2007/0021876 A1* | 1/2007 | Isaji .............. | B60K 28/066 701/1 |
| 2007/0194904 A1* | 8/2007 | Wey ............... | B60Q 1/448 340/467 |
| 2008/0040004 A1* | 2/2008 | Breed ............. | B60R 21/0134 701/45 |
| 2008/0272898 A1* | 11/2008 | Irion ............. | B60Q 9/008 340/436 |
| 2009/0189754 A1* | 7/2009 | Hochrein ......... | G08G 1/162 340/436 |
| 2010/0055649 A1* | 3/2010 | Takahashi ........ | B60W 30/00 434/66 |
| 2010/0109881 A1* | 5/2010 | Eskandarian ..... | A61B 5/6887 340/575 |
| 2010/0228419 A1 | 9/2010 | Lee et al. | |
| 2010/0312446 A1* | 12/2010 | Schofield ......... | G06K 9/00818 701/70 |
| 2012/0022739 A1* | 1/2012 | Zeng ............... | B60W 30/12 701/536 |
| 2012/0109415 A1* | 5/2012 | Nitta .............. | B60T 8/17557 701/1 |
| 2012/0109416 A1* | 5/2012 | Mizutani .......... | B60T 8/17557 701/1 |
| 2012/0116632 A1* | 5/2012 | Bechtel ........... | B60Q 1/1423 701/36 |
| 2013/0138294 A1* | 5/2013 | Schofield ......... | G05D 1/0244 701/36 |
| 2013/0253750 A1* | 9/2013 | Otake ............. | B60W 10/06 701/22 |
| 2014/0249722 A1* | 9/2014 | Hegemann ....... | G08G 1/16 701/41 |
| 2015/0073662 A1* | 3/2015 | Schmudderich ... | B62D 6/00 701/41 |

FOREIGN PATENT DOCUMENTS

| | | |
|---|---|---|
| DE | 10 2005 028 370 A1 | 12/2006 |
| DE | 10 2008 003 205 A1 | 7/2009 |
| DE | 10 2010 041 147 A1 | 3/2012 |
| DE | 10 2011 078 776 A1 | 1/2013 |
| EP | 2 562 060 A1 | 2/2013 |

\* cited by examiner

CONSISTENT BEHAVIOR GENERATION OF A PREDICTIVE ADVANCED DRIVER ASSISTANT SYSTEM

The present invention resides in the field of advanced driver assistance systems (ADAS). More specifically, the present invention provides a method and a system for generating a consistent behaviour in a decision for predictive advanced driver assistance systems.

A generation and a discard of decisions in an advanced driver assistance system (ADAS) are to be consistent and also comprehensible to external observers such as drivers of other vehicles or any participant in a real world traffic scenario.

A plurality of driving assistance systems for vehicles is available today aiming at increasing driving comfort and safety of the passengers of a vehicle. Relying on sensor equipment such as radar (radio detection and ranging), lidar (light detection and ranging), cameras for imaging, etc., for providing data of a host vehicle's environment, different functions related to driving or maneuvering can be implemented. The implemented functions may range from distance sensing and parking assistance up to sophisticated ADAS systems such as, for example, cruise-control functions (ACC). Such ADAS systems comprise for example Intelligent Adaptive Cruise Control (IACC) functionalities, which may also include a lane change assistant, collision mitigation functions, emergency braking, etc.

Functions related to ADAS may include a detection of other vehicles or objects moving in front or behind the ADAS equipped vehicle, and may include functions for predicting a future behavior of moving objects, e.g. with respect to a potential lane change of a vehicle detected ahead of the ADAS-equipped vehicle. It is a general requirement for assistance functions relying on predictions to operate with high reliability, to avoid generating situations that may let a driver of the ADAS-equipped host vehicle feel uncomfortable or even requiring intervention of the driver.

US 2010/0228419 A1 describes a technique for risk assessment in an autonomous vehicle control system. Each of a plurality of objects detected proximate to a host-vehicle carrying the autonomous vehicle control system is monitored by various sensor equipment such as long- and short-range radar and a front camera. Sensor data are fused and, based on the fused data, object locations are predicted relative to a projected trajectory of the host vehicle. A collision risk level between the vehicle and each of the objects during a lane-change maneuver is assessed with respect to potential actions of the detected objects such as continuing with a fixed velocity, mild braking, or hard braking. A lane change maneuver is controlled according to the assessment and risk tolerance rules specifying spatial safety margins.

Patent application publication EP 2 562 060 A1 describes a technique in a host vehicle for predicting a movement behavior of a target traffic object with respect to target objects cutting-in to a lane of travel of the host vehicle or cutting-out from the lane of travel of the host vehicle. The technique is based on two separate prediction subsystems, wherein a context based prediction (CBP) is related to recognition of a movement behavior, i.e. a determination of what will happen, while a physical prediction (PP) is related to a determination of how a behavior will or may happen. The context based prediction relies on at least indicators termed indirect indicators, while the physical prediction relies on so-called direct indicators.

Direct indicators comprise observable variables, which are observable if and only if the behavior to be detected has started. For example, for predicting a lane-change, a set of direct indicators may comprise one or more of a lateral velocity, a lateral position relative to the lane, a changing orientation relative to the lane, and a changing orientation relative to other traffic participants.

Indirect indicators comprise observable variables, which are already observable before the predicted behavior has started. Indirect indicators may be defined as a set of indicators excluding direct indicators. For example, indirect indicators may relate to information about a relation between at least one traffic participant and one or more other traffic participants or static scene elements, such as an indicator indicating whether or not a fitting gap is available on a lane neighboring to the host-vehicle.

Other indirect indicators may relate to information about driver intentions, which may actively be communicated by the traffic participant whose behavior is to be predicted. Examples are driver intentions indicated with a turning-signal, a braking-light, or information received via car-to-car-communication from other vehicles.

The ADAS generates, for example, brake signals for activation of the ADAS-equipped vehicle brake (hereinafter referred to as host vehicle or sometimes also termed ego-vehicle) and in response to an other vehicle's predicted behaviour, although the other vehicle did not yet start its anticipated manoeuvre. The other vehicle under specific consideration (hereinafter target vehicle) is nevertheless not continually be correctly tracked by a sensor of the host vehicle due to sensor malfunctions, excessive noise or simply due to occlusions by further vehicles or other obstacles in a line of a sensor. Hence, for example a decision to decelerate the host vehicle in an anticipation of a predicted scenario by generating a brake signal might be subject to revision in the subsequent processing cycles of the ADAS. There might even the situation arise that a decision of the ADAS is revised in quick succession and communicated to the exterior by the host vehicle, for example by applying brake or showing brake lights.

More specifically, for predicting a target vehicle's future positions in a first step, the probability for the target vehicle to perform one of a set of possible movement behaviors is estimated by the CBP. Some or all of these movement behaviors are validated by means of a PP. The purpose of the physical prediction is on one hand to validate the set of possible trajectories against a combination of the results of the CBP, the physical evidence, and vehicle relations. Second, it estimates the future position of each vehicle. In a final step a mismatch detection analyzes the consistency of the PP and the CBP. In case of mismatch, a fallback to the PP can be performed.

While predictions serve generally well as a basis for decisions in advanced driver assistance systems, there remain problems. Generally, sensor data are prone to errors such as detection failure, late detection and false detection, which in turn may lead to less reliable predictions by the ADAS. Providing additional sensor equipment may serve to improve the available data base, but at increasing costs and hardware complexity.

Problems may also result from wrong predictions which result from limited or wrong sensor data. Active control performed based on a wrong prediction may need to be stopped and reversed when the target vehicle shows an unpredicted behavior or a behavior which has been predicted with an inappropriately low probability. The resultant control of the host vehicle may seem inappropriate, confusing and not comfortable to the driver and other traffic participants. The assistance system described in EP'060 intends to minimize wrong predictions as far as possible by means of the introduction of situation models and a mismatch detection, amongst others.

The basic problem of ADAS systems resides in the fact that a decision signal leading to the systems decision is not necessarily stable. If, for example, the system identifies a vehicle in front of the host vehicle and decides that decelerating by applying a brake is necessary in order to deal with the oncoming situation, and the target vehicle is then lost by the host vehicle's sensors but is nevertheless physically still present, a stabilization of the ADAS system's decision and respective vehicle control reaction is required.

Typical ADAS systems try to generate a stable signal, either as basis for the ADAS systems decision or behaviour, or other systems stabilize the decision by just keeping the decision invariable for a certain time. However, in a dynamically changing environment, this static stabilisation leads to either fluctuation in the decision, if the stabilization time is selected to be too short, or to high latency in case of change in the environment, that required the cancellation of the system decision. If, in order to continue the introductory example, the target vehicle can be perceived to change the lane, a sensor loss can be excluded. Due to the explicit information with a high confidence that the target vehicle is perceivable and behaving in a certain way, the target vehicle is no longer of dominating interest to an ADAS system and the ADAS system is further able to revise a brake decision. Nevertheless a system might keep the decision to brake for the target vehicle until the timeout of the stabilisation is reached.

There is the technical problem to be solved of providing stabilized system decisions in a driver assistance system without increasing the latency of the system's decisions.

The problem is solved by providing a method for a driver assistance system for a vehicle, the host vehicle comprising at least one sensor means, at least one actuating means and a control means, wherein the method comprises steps of generating a decision signal by a first evaluation of sensor data acquired by the sensor means, by generating an activation signal for the actuating means when the decision signal exceeds a signal threshold; by further generating a decision interrupt signal based on a second evaluation, by stabilizing the activation signal in a temporal manner, deciding based on the decision interrupt signal if to interrupt stabilizing the activation signal, and interrupting stabilizing the activation signal, when it is decided to interrupt stabilizing the activation signal.

It is further preferred that the decision signal is temporally filtered with a low-pass filter.

In a further preferred embodiment, the activation signal is generated based on the decision signal taking a hysteresis into account.

The activation signal may, in an embodiment of the method be maintained for a predetermined time when the decision signal returns to a value below the signal threshold.

The method can also comprise stabilizing the activation signal in a temporal manner by stabilizing the activation signal for a predetermined time.

It is further preferred that the step of the second evaluation comprises evaluating of one or more parameters, the parameters comprising at least one vehicle indicator and/or at least one environment indicator and/or at least one further vehicle indicator in order to generate the interrupt decision signal.

In an embodiment of the method, the signal threshold is determined dynamically based on the sensor data and/or an internal state of the vehicle.

In a further aspect of the invention, there is provided a driver assistance system for controlling a vehicle, the driver assistance system comprising at least one sensor means configured to acquire sensor data, at least one actuating means configured to perform a control action for the vehicle, and a control means, wherein the control means comprises first evaluation means configured to generate a decision signal from the sensor data acquired by the sensor means, and an activation decision means configured to generate an activation signal for the control action when the decision signal exceeds a signal threshold, and a second evaluation means configured to generate a decision interrupt signal, a stabilization means configured to stabilize the activation signal in a temporal manner, an interrupt decision means configured to decide based on the decision interrupt signal whether to interrupt stabilizing the activation signal, wherein the stabilization means is configured to interrupt stabilizing the activation signal when it is decided to interrupt stabilizing the activation signal.

It is further preferred that the signal threshold is predetermined.

In an embodiment of the system, the signal threshold is determined dynamically based on the sensor data and/or an internal state of the vehicle.

It is further preferred that the control means comprises filter means configured to temporally filter the decision signal with a low-pass filter.

In an embodiment the control means is configured to stabilize the activation signal taking a hysteresis into account.

In an embodiment of the system the activation decision means is configured to maintain the activation signal for a predetermined time when the decision signal returns to a value below the signal threshold.

In an embodiment of the system the activation decision means is configured to stabilize the activation signal in a temporal manner by stabilizing the activation signal for a predetermined time.

It is further preferred that the decision interrupt signal comprises a lane change signal for a further vehicle.

The lane change signal for the further vehicle is in one embodiment issued before the further vehicle changes a lane.

The system or the method is in one embodiment included in an adaptive cruise control system.

The activation signal can be, for example, a brake signal.

It is further preferred that the second evaluation means is configured to evaluate one or more parameters, the parameter comprising at least one vehicle indicator and/or at least one environment indicator and/or at least one further vehicle indicator to generate the interrupt decision signal.

It is further preferred that the second evaluation comprises evaluating input data comprising the sensor data based on a classification algorithm, wherein the classification algorithm comprises a support-vector-machine algorithm or a nearest-neighbour-classifier algorithm.

The system according to one embodiment may include a first evaluation comprising generating the decision signal based on context-based prediction.

The solution to the technical problem is particularly advantageous when being employed in a predictive ADAS. Predictive ADAS systems have an inherent uncertainty if the predicted event will eventually occur. If in case of a host vehicle with an active predictive ACC component of the predictive ADAS, a target vehicle on a neighbouring lane is detected to approach its preceding vehicle fast, the predictive ACC algorithm will predict a lane change of the target vehicle with a high probability. The predicted behaviour of the target vehicle will accordingly result in a decision to slow down the host vehicle by deciding to brake for the potential cut-in target vehicle. If the decision for braking is maintained for a given time in order not to end up in a succession of brake-not-brake decisions on the one hand, and on the other hand, the target vehicle also starts to brake for the preceding vehicle, a new situation arises and is detected and decided by the second evaluation. Hence, the generation of the decision interrupt signal and the decision to interrupt the stabilization of the decision to brake opens a capability of the predictive ADAS to evaluate and adapt to the new situation. The time to react to the new situation, a situation which requires to evaluate the scenario and to decide how to adapt to the scenario, is therefore advantageously reduced when confronting the predictive ADAS with a new situation for the claimed method and system.

The current method stabilizes the ADAS systems decision and provides an explicit decision interrupt signal based on evaluated changes in the decision environment that justify a change in the systems decision. The explicit detection and determination of changes instead of using missing evidence for the decision enables to interrupt the stabilization process reliably. The proposed method therefore reduces the latency time required to adapt the systems behaviour to a changed situation.

The basic idea of present invention is to stabilize the system's decision and detect changes in the environment requiring the adaptation of the systems behaviour to cancel or interrupt the stabilisation. Thereby a quick adaptation of the system to new situations is achieved and the problem of fluctuating decision signals and sensor data and high latency in the systems decision is overcome.

The host vehicle may be a car, truck, or bus, or in general any object intended for driving on a road, motorway, etc. This includes manned vehicles driven by a driver as well as autonomously driven vehicles such as robot vehicles. In this respect, the term driver assistance system is to be interpreted as including in general any kind of driving assistance system which may be employed in an unmanned vehicle as well.

Similarly, the detected objects may include any kind of moving objects such as other vehicles, cars, trucks, vans, motor/cyclists, robotic vehicles, but also trolleys, pedestrians, and even animals such as horses. The objects may be detected by any kind of sensor equipment or circuitry hosted by the host vehicle. The object under consideration for a specific prediction may be referred to as target object or a target vehicle when applicable.

The first and second evaluation are separate from each other in the sense that each evaluation operates to provide a prediction of a behavior of a detected object independent of the prediction or decision provided by the other evaluation. The predictions of the evaluation may rely on different data sets comprising plural data items as provided by a sensor means of the host vehicle, such that the data sets differ in at least one data item. It is noted that the term sensor data is understood herein as also including data received by a driver assistance system via, e.g., direct car-to-car communication or indirect communication via fixed base (transceiver) stations situated along a road, information provided via wireless or mobile communication networks, for example from a traffic information system, etc.

Additionally or alternatively, the first and second evaluation may rely on one and the same sensor data, but different data sets with respect to the detected environment of the host vehicle, such that the data sets differ in which of the detected moving or still objects are considered for the predictions.

Additionally or alternatively, the activation signal may indicate a control of equipment of the vehicle and may indicate, for example, switching on or off a motor, or employing a brake, or a signal or light of the vehicle, such as a turn light, braking light, or a warning signal.

According to some embodiments of the method, the first and second evaluation comprise at least one of a context based prediction evaluation for predicting behavior based on indirect indicators observable before a start of a predicted behavior, and a physical prediction evaluation for predicting behavior based on direct indicators observable after a start of a predicted behavior.

The above-indicated need is further satisfied by a computer program product comprising program code means for performing the method according to any one of the methods and method aspects outlined above or elsewhere herein, when the computer program product is executed on a computing device, for example one or more electronic processing modules of a vehicle. The computer program product may be stored on a computer readable recording medium, such as a permanent or re-writeable memory within or associated with a computing device or a removable CD-ROM, DVD or USB stick. Additionally or alternatively, the computer program product may be provided for download to a computing device, for example via a data network such as the Internet or a communication line such as a telephone line or wireless link.

The above-indicated need is further satisfied by a vehicle comprising a system such as outlined above and/or described elsewhere herein.

The invention allows minimizing the number of error situations which may result in forced return of control to the human driver. The invention generally allows improving the response performance of driving assistants with respect to generation of a consistent behaviour of the generated decisions of the ADAS system. By applying the invention, the field of operation for driving assistant systems can be extended to cover appropriate control even in more complex and dynamic scenes than before.

The invention is applicable for many driving assistant functions generating decisions and in particular, when relying on predictions, such as, but not limited to, any kind of cruise control functions in an ADAS system. The additional functionality of consistent behaviour generation may for example be implemented in form of software modules comprising computer executable code. Existing implementations of a driver assistance system may then merely require a software update.

The invention is discussed with reference to the appended figures, the figures depicting in FIG. 1 a vehicle equipped with an embodiment encountering an exemplary traffic situation;

FIG. 2A to 2D illustrations of a decision signal and a activation signal over time illustrating the effects of an embodiment.

Figure 3:
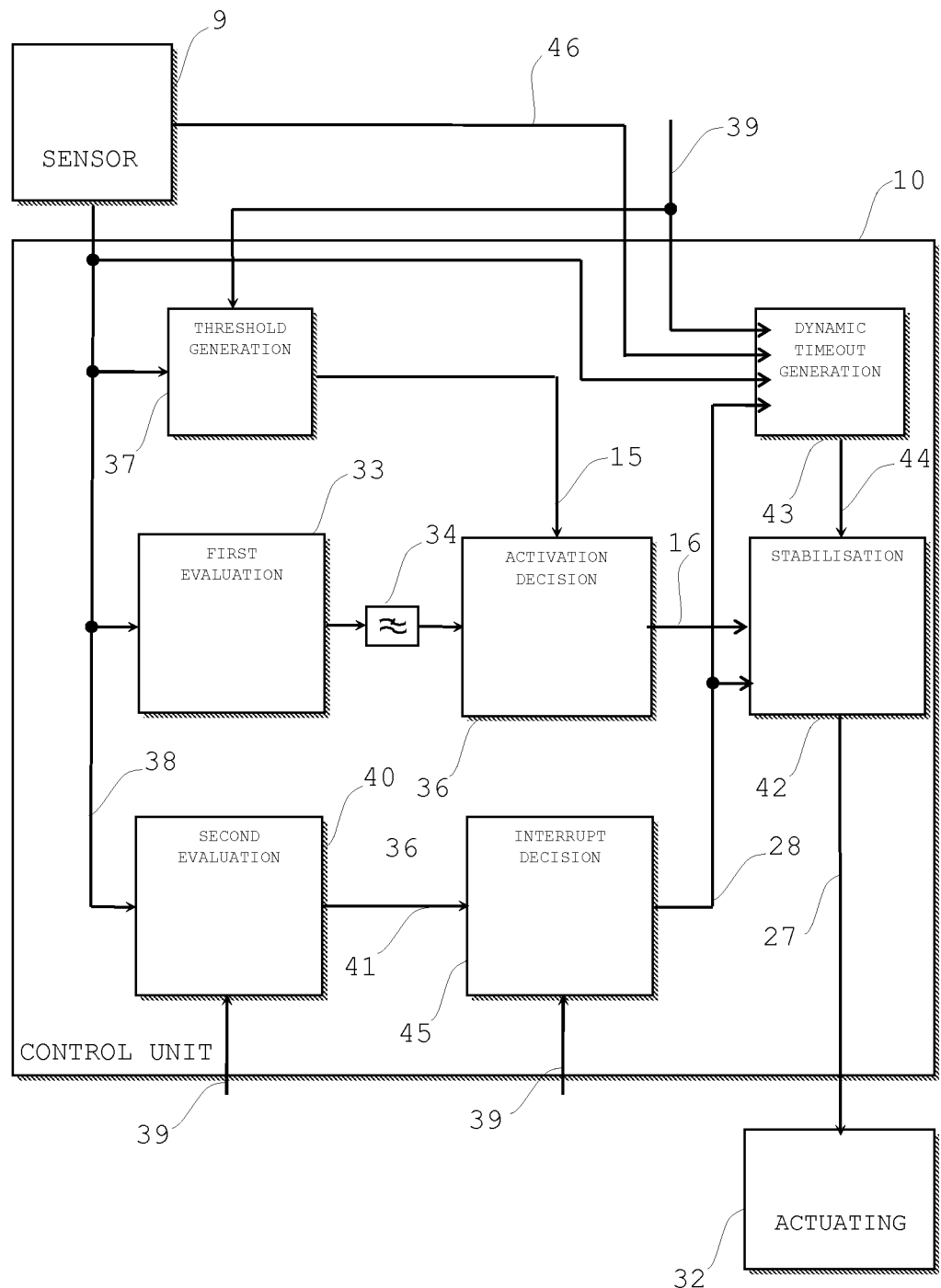

FIG. 3 a block diagram of the functional modules of an embodiment; and

Figure 4:
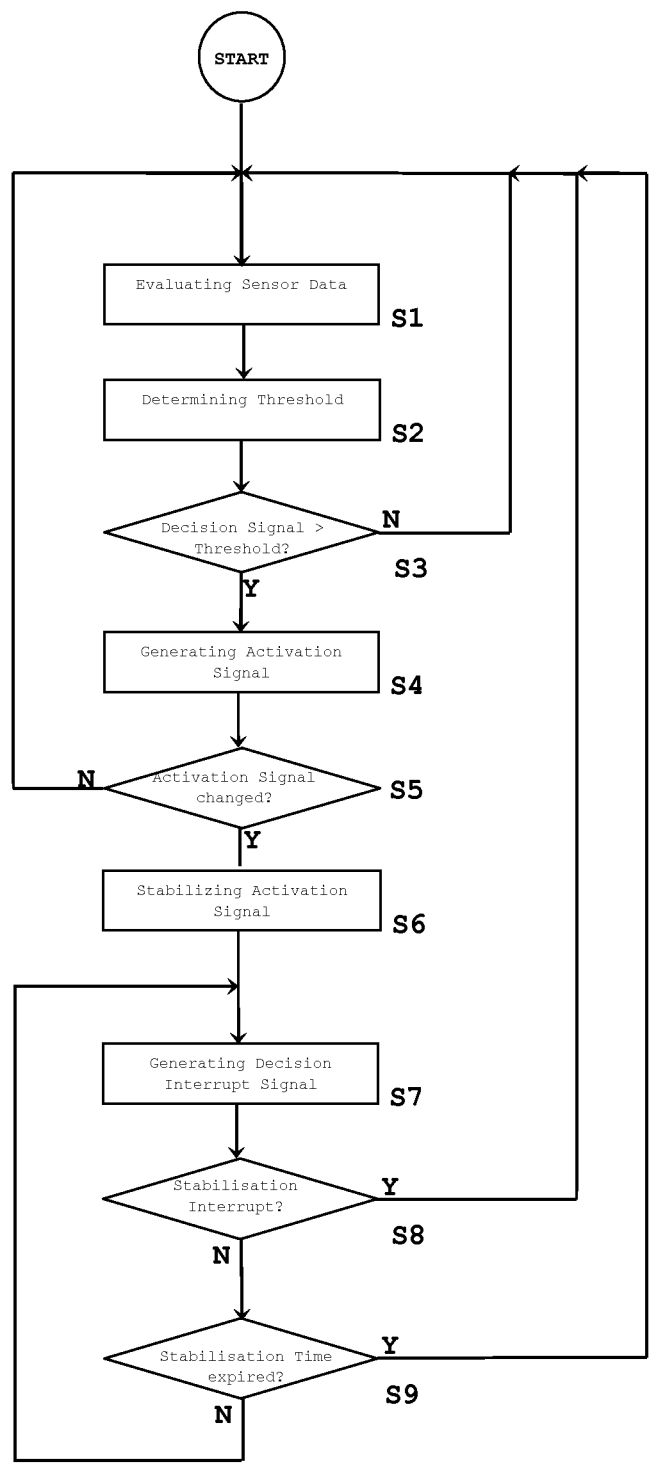

FIG. 4 a flowchart describing the operation sequence in a control means of an embodiment.

FIG. 1 illustrates a traffic situation 1 with vehicles 2, 3, and 4 moving along a road 2 with three lanes 5, 6, and 7 and a branch-off lane 8. The vehicle 2, herein in the following also referred to as host vehicle, is equipped with sensor equipment 9 corresponding to the sensor means 9 in the appended claims, and further an ECU 10 (Electronic Control Unit—corresponding to the control means in the appended claims). The ECU 10 may be implemented by one central or by plural distributed hardware units such as signal processors, central processing units (CPU) onboard the host vehicle 2. Software or firmware is installed on the ECU 10 in order to implement one or more adaptive driving assistant systems (ADAS) to assist a driver in control of the host vehicle 2.

When discussing embodiments of the invention on the ECU 10 is at least one ADAS function implemented, such as a version of a predictive advanced cruise control (ACC) system or another cruise control function, the operation of which includes a prediction of the further evolution of the scenario shown in FIG. 1 in the future, including a prediction of the further behavior of host vehicle 2. The following description of an embodiment is based on the ACC system for sake of clarity, but by no means limited thereto.

FIGS. 2A to 2D showing an embodiment of the present invention are now discussed with reference to the traffic scenario in FIG. 1. In the embodiment depicted in FIGS. 2A to 2D, signals are shown with their respective signal values on the ordinate axis and the abscissa axis 17 showing the time.

Figures 2A, 2B, 2C, 2D:
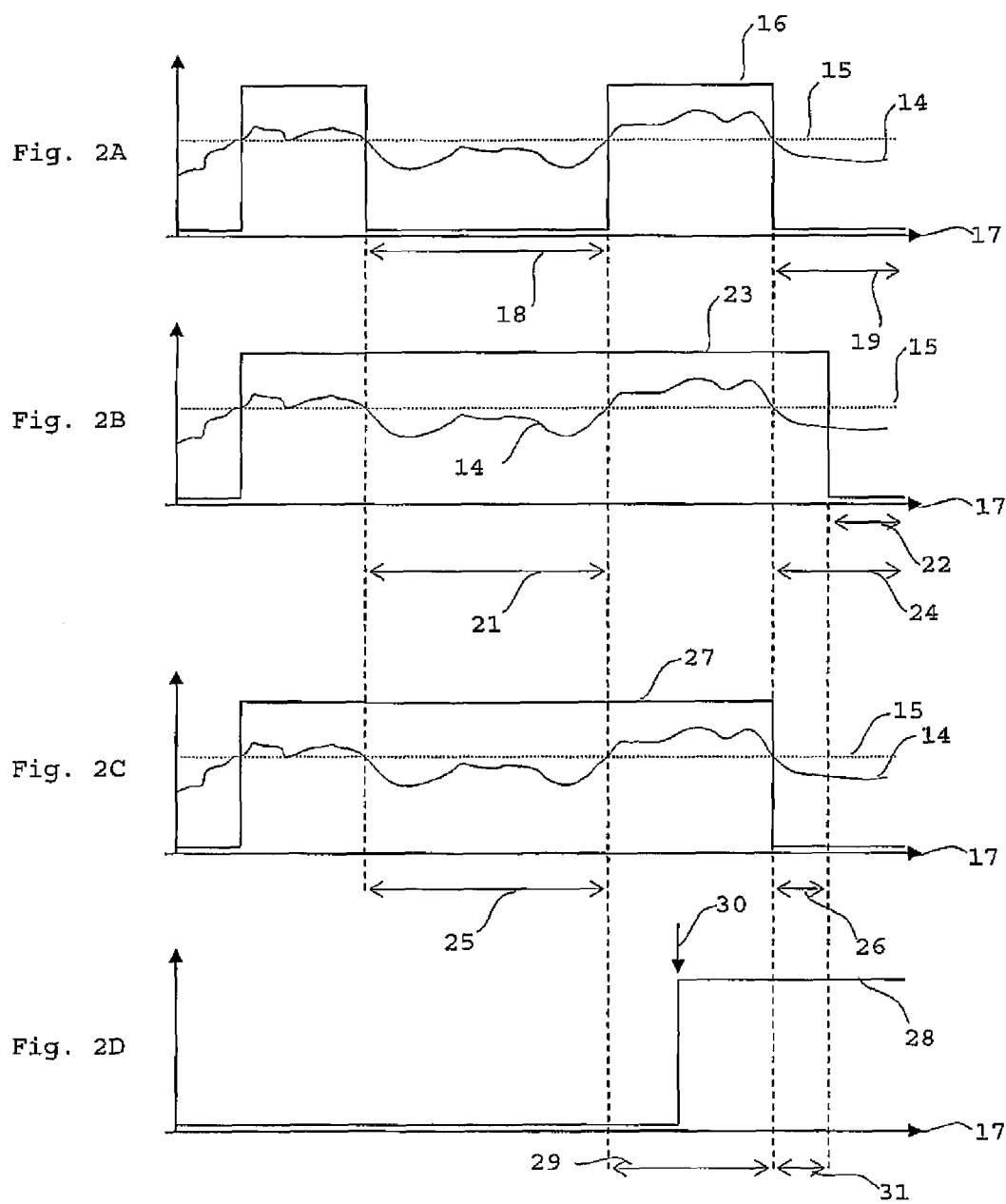

In FIG. 2A a decision signal as basis for the ACC system decision under consideration is generated by a first evaluation in the form of a computation that is based on one or more data items of sensor information and optionally an internal state of the system. The systems decision is then derived by, e.g. comparing the generated decision signal to a signal threshold. FIG. 2A depicts the decision signal 14, a signal threshold 15 and an activation signal 16 representing the decision made by the ACC system. The decision signal 14 can, for example, represent the difference in velocity to the preceding target vehicle 3 and the decision to brake is taken if the difference in velocity exceeds a certain threshold 15. If the decision signal 14 is high, the host vehicle 2 decelerates and does apply the brakes of the host vehicle. The decision signal 14 in FIG. 2A shows the typical fluctuation due to unsteady and noisy input data from sensor means 9 to the ACC system. In a region 18 of FIG. 2A, for example the decision signal 14 breaks down because the target vehicle 3 is lost by the sensor means 9 of the host vehicle 2 due to occlusion, for example. As a consequence, an unstabilized decision taken based on the decision signal 14 also fluctuates. The unstabilized decision resp. decision signal 14 in FIG. 2A leads to an activation signal 16 dropping to a low value in region 18 of FIG. 2A as well as in region 19 of FIG. 2A. The host vehicle 2 therefore stops braking even though the target vehicle 3 is still present but, for example, not perceived any longer in the traffic scenario 1 according to FIG. 1. For an external observer such as a driver of another vehicle 3, 4, this is not comprehensible because he will not know that the ACC system of the host vehicle 2 currently cannot perceive the target vehicle 3. Contrary to this in region 18 of FIG. 2A the vehicle changes the lane 5, 6, 7 on course 13 and is no longer the predicted predecessor of the host vehicle 2. In consequence the ACC system of the host vehicle 2 should not react any longer to the target vehicle 3 and the decision to brake should be cancelled. In FIG. 2A this actually is initiated by the ACC system because the ACC system is not stabilized. Therefore, the activation signal 16 drops in a region 19 of FIG. 2A to a low value.

In order to prevent the unfavourable braking decision in FIG. 2A, region 19, ACC systems may employ stabilizing the perception and therefore the decision signal 14. Rather than stabilizing the decision signal 14 and thus all parts of a processing chain of the ACC system usually comprising sensor means 9 together with all subsequent processing steps, the systems decision can be stabilized by stabilizing the activation signal 23 as shown in FIG. 2B. This form of stabilization has the advantage that it is independent of the processing steps forming part of the ACC system and the sensor means 9 and takes into account all possible problems leading to signal fluctuations in the processing chain from sensor means 9 onwards.

FIG. 2B shows the effect of fluctuations of the decision signal 14 in decision stabilization. By keeping the decision for a certain time even though the decision signal 14 drops in a region 21 of FIG. 2B again below the signal threshold 15, a stabilized decision can be achieved. The unfavourable drop of the decision signal 14 in a region 21 of FIG. 2B due to the target vehicle loss by the sensor means 9 is now overruled contrary to the activation signal 16 in FIG. 2A by the activation signal 23 in FIG. 2B. However, in the region of FIG. 2B where the target vehicle 3 has left the host vehicle's lane 5 in favour of lane 7 and exits lane 8 on a trajectory 13, the decision to brake is now also kept. This is shown in the embodiment in FIG. 2B by the activation signal 23 still being in the high level in region 24 and dropping to low level in region 22 later than the activation signal 16 in region 19 of FIG. 2A. This behaviour of the activation signal 23 introduces latency in the ACC systems reaction to those changes in the scenario environment. As such it poses a major problem as the latency in reaction based on the taken decision is not comprehensible to the driver of the host vehicle 2 and other traffic participants thereby lowering the acceptance of the ACC system of the discussed embodiment.

FIGS. 2C and 2D show an advantageous embodiment of the invention. The basic idea of the present invention is to stabilize the system's decision and detect changes in the environment requiring the adaptation of the systems behaviour to cancel or to interrupt the stabilization of a decision. Thereby a quick adaptation of the ACC system to a new situation is achieved and the problem of a fluctuation and a high latency in the ACC system's decisions is overcome.

The ACC system stabilizes the system's decision to employ an activation signal for braking the host vehicle 2 but additionally detects changes in the environment like a lane change according to trajectory 13 of the target vehicle 3, the system detects the lane-change of the target vehicle 3 in region 25 and thus is able to interrupt the stabilization of the activation signal 27 in FIG. 2C. This effect is shown in FIG. 2C, where a stabilized decision resp. activation signal 27 does not fluctuate in region 25 but quickly drops in region 26 to a low level. The ACC system according to an embodiment has no evidence in region 25 of FIG. 2C, to a scenario change because the target vehicle 3 disappeared from the perceived traffic scenario 1. Therefore, in region 25 of FIG. 2C the ACC system continues the decision stabilization by maintaining the activation signal 27 at high level. However in a region 26 of FIG. 2C, the ACC system perceived a lane change manoeuvre on the trajectory in FIG. 1 concerning the target vehicle 3 and thus could detect a situation to interrupt the stabilization process. FIG. 2D shows as an example a decision interrupt signal 28 over time 17. At a time 30 in FIG. 2D, a changed decision environment is perceived by means of a second evaluation and decided with a high degree of confidence. Hence, a stabilization interrupt signal 28 changes to a high level. As a consequence, the decision is abandoned, resulting in FIG. 2C to a drop of the activation signal 27 to a low level at the start of the period 26. Hence, according to embodiment of the claimed invention, the ACC system quickly reacts to the new scenario by abandoning the brake decision in the scenario according to FIG. 1 by setting the activation signal 27 to low level. In the described traffic scenario 1, the time 30 for deciding the changed environment for the decision is detected and decided before the decision signal 14 drops to a value below the signal threshold 15 at the beginning of period 26 in FIG. 2C. Nevertheless the second evaluation may also lead to generating a decision signal 41 and deciding an interrupt at any other time. When the stabilisation interrupt signal 28 changes to the high level in FIG. 2D, the stabilisation of the activation signal 16 is terminated and an activation decision means 36 is enabled to make a decision on an action based on the decision signal 14 and threshold 15 for the actual scenario anew.

FIG. 3 illustrates functional components of the ECU 10 of the host vehicle 2 according to an embodiment of the invention. As a specific example, the functional components described and discussed below may be associated to a cruise control module implementing one or more ACC functionalities in the ECU 10 resp. control means 10.

Sensor data 38 from the sensor means 9 is obtained by a first evaluation means 33 which operates to generate predictions by generating a decision signal 14 based on the sensor data 38. The decision signal 14 representing information related to a generated prediction is provided to an activation decision means 36 which is configured to determine whether the decision signal 14 exceeds a signal threshold 15. The signal threshold 15 is generated in a dynamic threshold generation means 37 based on sensor data 38 and/or a vehicle state 39 of the host vehicle 2. When the activation decision means 36 decides the decision signal 14 to exceed the signal threshold 15, an activation signal 16 is generated.

The activation signal 16 at a high level corresponds to an active control of the ACC system required for the host vehicle 2. This may be a brake signal in the present embodiment when confronted with the traffic scenario 1 depicted in FIG. 1. The activation signal 16 is adapted to accordingly control one or more components of the host vehicle 2 related to control of specific functions of host vehicle 2, exemplarily illustrated by components adapted for braking control (BC), acceleration control (AC), and steering control (SC). These components are all included in the actuating means 32 of FIG. 3.

More specifically, the sensor means 9 may comprise one or more radar transceivers, one or more cameras, one or more laser distance measurement devices, etc. The first evaluation means 33 may comprise a module or subsystem for generating physical predictions (PP) and/or a module or subsystem for generating context based predictions (CBP). The sensor data accepted from sensor means 9 is provided to an intermediate data processing which may comprise a component for providing direct data indicators (dI), and a component for providing indirect data indicators (iI). The direct indicators serve as a data basis for both the PP subsystem and CBP subsystem, while the indirect indicators serve as a data basis for the CBP subsystem only.

FIG. 3 shows the functional components of the ECU 10 in the host vehicle 2. As a specific example, the functional components described and discussed below may be associated to a cruise control module implementing one or more ACC functionalities in the ECU 10.

In a first step, the decision signal 14 is generated in the evaluation means 33 based on the sensor data 38. The sensor data 38 undergoes transformation in a processing chain of the ACC system in order to generate a suitable signal to base a decision for generation of an activation signal 16 thereon. The activation signal 16 may be a brake signal in one embodiment. Nevertheless the activation signal 16 may represent any other signal generated based on a decision in the ACC system. In a threshold generation means 37 a signal threshold 15 is generated and supplied to an activation decision means 36. The signal threshold 15 may either be predefined or may be calculated according to sensor data 38 or other sensory information or may be determined according to an internal state 39 of the host vehicle 2 resp. ACC system like the time a vehicle 3, 4 was seen, the host vehicle 2 velocity or the occlusion information derived from traffic scenario geometry. This optional dynamic threshold computation would take place in the dynamic threshold generation means 37. The decision signal 14 can be either a raw signal as delivered by a processing chain of an ACC system or a temporally filtered decision signal. The optional filtering is done in a filter means 34 being implemented as a low-pass filter or alternatively or additionally by a hysteresis on the decision signal 14 generated in the first evaluation means 33.

Further on, the control means 10 generates a decision interrupt signal 41 by detecting typical situations in the decision environment that require a change in the system behaviour. This decision interrupt signal 41 is computed in a second evaluation means 40 of the control means 10 for example based on sensor data 38 and/or the internal state 39 of the ACC system, but nevertheless not limited thereto.

In the activation decision means 36 the decision signal 14 is compared to the signal threshold 15 in order to generate an activation signal 16 when the decision signal 14 exceeds the threshold 15. The activation signal is then supplied to a stabilization means 42 being configured to stabilize the activation signal 16 and to provide a stabilized activation signal 27.

The activation signal 16 representing the resulting ACC system decision may be stabilized in the stabilization means 42 using temporal filtering, e.g., by keeping the system decision and the activation signal 16 for a defined time in a defined state. This defined time can either be derived from a fixed constant time span or can be dynamically calculated in a dynamic timeout generation means 43 according to, e.g. sensor confidence 46, environmental information like the number of vehicles and/or host vehicle information like the current host vehicle velocity, sensor data 38 or the vehicle state 39. The optional dynamic timeout would be provided by the dynamic time out generation means 43 to the stabilization means 42.

Additionally, the stabilization interrupt signal 28 output by the stabilization interrupt decision means 45 is used to interrupt the stabilization. The stabilization interrupt signal 28 can, in one embodiment of the invention, be used, for example, for resetting a timeout in the stabilization means 42 generated by the a dynamic timeout generation means 43 for holding the activation signal 16 after a change in the activation signal 16 and thereby enable to switch the decision of the ACC system.

Eventually, a stabilized activation signal 27 representing a decision of the ACC system is output by the stabilization means 42 and provided to one or more actuating means 32 to generate an externally observable behaviour of the ACC system and thereby the host vehicle 2 based on a decision taken on sensor data 38.

The second evaluation means 40 is configured to execute the second evaluation based on a classification algorithm applied on one or more parameters. The classification algorithms employed may be, as mere examples, algorithms such as the support-vector machines, the nearest-neighbor-classifiers or similar algorithms being suitable to determine if the ACC system in a specific situation of the scenario should by enabled to cancel a taken decision, e.g., a brake decision. In the above cited example in FIG. 1, a lane change of the target vehicle 3 on the lane change trajectory 13 can be detected as such a typical situation by a classifier and the stabilization algorithm like hysteresis or timeout stabilization of the respective activation signal 16, in the illustrative example a brake signal, is interrupted based on the decision interrupt signal 41.

More specifically, in an embodiment of the invention, the second evaluation means 40 generates the decision interrupt signal 41 and supplies it to an interrupt decision means 45 of the control means 10. The decision interrupt means 45, for example, compares the decision interrupt signal 41 with a decision threshold and, when the decision threshold is exceeded by the decision interrupt signal 41, the decision interrupt means outputs a stabilization interrupt signal 28 to the stabilization means 42 for interrupting the stabilization of the activation signal 16 and therefore the stabilized activation signal 27. This allows the ACC system to quickly adapt the behavior to the new situation, which might result in reshaping the decision based on the sensor data 38 and its evaluation in the first evaluation means 33.

In the given example scenario 1 in FIG. 1, the stabilization of the activation signal 27 is terminated when the host vehicle 2 and its ECU 10 reliably detects the lane change of the target vehicle 3 towards the exit lane 8 on the trajectory 13. The brake signal being applied in response to an anticipated change of the target vehicle 3 on a trajectory 12 from lane 6 to lane 5 following a predictive decision of the ACC system of the host vehicle 2 may therefore be subject to adaptation to the new situation in the traffic scenario 1.

The second evaluation means 40 classification algorithms are applied on one or more parameters for deciding independent from the first evaluation on the traffic scenario 1. The parameters which could be used for effectively judging the scenario may be, for example, indicators based on the host vehicle 2 and its behaviour such as, for example, the host vehicle 2 itself starting a lane change as indicated by the blinker of the host vehicle 2, the position in the lane 5, 6, 7 or a typical lateral movement of the host vehicle 2. Another indicator relating to the host vehicle 2 and its vehicle state 39 may be the deactivation of the predictive ACC system by the driver of the host vehicle 2 by, e.g., using an off-switch or hitting a brake pedal of the host vehicle.

Other suitable parameters to be taken into account in the second evaluating means 40 are environment based indicators. These environment based indicators comprise detected traffic rules indicated by a traffic sign 9 like "no overtaking allowed", "speed-limit", "exit lane starting" or information on the road like solid "no-overtaking lane markers".

Other vehicle based indicators may comprise the detection that a target vehicle 3, e.g., on the right lane 7, changes the lane to an irrelevant lane, i.e. to the right lane 7.

The second evaluation means 40 evaluating and the interrupt decision means 45 deciding that the target vehicle 3 brakes to the speed of its predecessor vehicle 4 is also a suitable other vehicle indicator. Also the detection that the target vehicle 3, e.g. on the right lane 6, sets blinker to an irrelevant lane, i.e. the right blinker. The given examples of parameters or indicators for basing the second evaluation thereon are by no means intended to be exhaustive. Any other suitable indicator may be used alone or in combination with other indicators for generating the decision interrupt signal 41.

In one step a perceived environment of the host vehicle 2 is perceived to detect changes in the environment that require in change in the ACC system's reaction and therefore the activation signal 16 and stabilized activation signal 27. At this stage it is important to separate sensor problems such as vanishing vehicles, suddenly changing lane directions etc. from actual changes in the environment.

An operation of the ECU 10 will be described in more detail with reference to the flow diagram of FIG. 4. Generally, the operation of the ECU 10 is related to an active control of host vehicle 2 by issuing for example brake signals, deceleration signals, steering signals, etc.

For reasons of conciseness the discussion will focus on potential future behaviors of the host vehicle 2 in the situation depicted in FIG. 1. Therefore it is assumed that all behaviors correlated to the vehicle trajectories 13 and 12 are related to the detected or target moving object or target vehicle 3, while in practice predictions of the ACC system may comprise predicted behaviors for more or all moving objects detected by the sensor means 9 which may, for example, include predictions for the other vehicle 4 further ahead of the host vehicle 2.

Another indirect indicator may relate to relative velocities of the vehicles 2, 3, 4 to each other. Referring to the exemplary situation in FIG. 1, vehicles 2, 3 and 4 travel with individual velocities and in directions indicated by the respective arrows attached to the vehicles 2, 3, 4 representations respectively, which are indicated in the FIG. 1 as absolute velocities relative to ground for ease of understanding. It is assumed that the host vehicle 2 has a higher absolute velocity than vehicle 4 with its lower velocity. The fact that vehicle 3 approaches vehicle 4 may be used by the ACC system in the first evaluation means 33 as one indication that target vehicle 3 may perform a lane change when further approaching vehicle 4 both traveling on lane 6. The lane change may lead on the trajectory 12 to lane 5, where the host vehicle 2 is approaching with an even higher velocity.

In the scenario shown in FIG. 1 an active driving assistance system is assumed. When the target vehicle 3 has not yet actually started a lane change or the lane change is not yet clearly detectable by the sensor means 9 of the host vehicle 2, the decision of a potential lane change of vehicle 3 with highest probability of all analyzed potential behaviors of the target vehicle 3, on the basis of the context based analysis, is to be made. In case the velocity of host vehicle 2 is above the velocity of vehicle 3, the activation decision means 36 may then decide to generate an active control signal in the form of the activation signal 16 to initiate a strong braking of the host vehicle in order to allow vehicle 3 the lane change on trajectory 12 and to avoid a potentially dangerous situation.

It is assumed here for the purpose of discussion that the target vehicle 3 in fact follows trajectory 13 rather than the predicted trajectory 12. As an example, vehicle 3 may take an exit lane 8 of the road section, and the exit has either not or not yet been detected by sensor means 9 due to a general limitation of the sensor means 9 regarding analysis of non-moving objects and/or due to data fuzziness, or the behavior related to the trajectory 13 has been assigned a low probability only in the context based analysis in the first evaluation means 33, for example due to a high absolute velocity of vehicle 3.

The operation as illustrated in FIG. 4 starts in step S1 with evaluating sensor data 38 with a first evaluation and generation of a decision signal 14 based on the first evaluation. In step S2 a signal threshold 15 is determined, either by calculating from sensor data 38 or other sensory information or by reading a predefined signal threshold 38 from a storage means. The decision signal 14 and the signal threshold 15 are compared in a step S3. When the decision signal 14 is determined to exceed the threshold 15 the method proceeds to step S4. If the decision signal 14 does not exceed the threshold 15, it is judged that no situation requiring a defined control action, such as, e.g., issuing a brake command, has to be addressed by the ACC system and the method returns to step S1.

If the decision signal 14 exceeds the threshold 15 in step S3, a decision to a traffic situation where an activation signal 16 is appropriate, is decided. The method therefore proceeds to step S4 and generates an activation signal 16. In the scenario in FIG. 1, the activation signal 16 comprises a brake signal in the host vehicle 2 in order to cope with the target vehicle 3 changing on the trajectory 12 from lane 6 to lane 5 in order to evade a collision with the vehicle 4 with low velocity in front of target vehicle 3. In the succeeding step S5 in FIG. 5 it is determined, if the activation signal 16 has been changed in the step S5, and if not the method returns to step S1. If indeed a brake signal resp. activation signal 16 is issued and accordingly the activation signal 16 changes, the method proceeds to step S6. In step S6 the activation signal 15 is stabilized in order to cope with sensor data fluctuations and then the method proceeds to the step S7.

In step S7 the control means 10 generates a decision interrupt signal 41 by detecting typical situations in the decision environment that require a change in the ACC system behaviour. This decision interrupt signal 41 is computed in a second evaluation means 40 of the control means 10, for example based on sensor data 38 and/or the internal state 39 of the ACC system 39. But any of the suitable parameters might serve to generate the decision interrupt signal 41 by the second evaluation in step S7.

In step S8 the interrupt decision signal 41 is compared to a threshold in order to decide if a stabilization interrupt of the activation signal 16 is necessary. Any other kind of deciding can also be used instead or in addition to comparing the interrupt decision signal 41 with a threshold. If a stabilization interrupt of the activation signal 16 is decided to be necessary as a new situation has been detected, e.g. the target vehicle 3 is confirmed to change on trajectory 13 to the exit lane 8 in FIG. 1, the stabilization of the activation signal 27 is terminated and the method returns to step S1 for new assessing of the situation based on the first evaluation.

If a stabilization interrupt of the activation signal 16 is decided not to be necessary, as e.g. a new situation cannot be detected with sufficient confidence, e.g. the target vehicle 3 changing on trajectory 13 to the exit lane 8 in FIG. 1 is not detected or not detected with sufficient probability, the stabilization of the activation signal 27 continues and the method therefore proceeds to step S9.

In the succeeding step S9 it is determined if the stabilization of the stabilized activation signal 27 is to be terminated due to a preset or an adaptively determined stabilization time running out. If the decision in step 9 is yes, the method returns to step S1 for assessing the traffic scenario based on the first evaluation. If the stabilization time in step S9 is still determined to be running, the method proceeds to step S7 for continuing stabilizing the taken decision resp. outputting the stabilized activation signal 27 to the activation means 32.

The method and the system as claimed are suitable to avoid confusion of other traffic participants, minimize disturbance of traffic flow, etc. The entire environment of the host vehicle 2 might have to be evaluated in this respect, including a rearward area. The control means 10 may adapt a strength, a limit and/or timelines for an active control of the host vehicle 2 by the activation signal 27 accordingly.

As a further example for its operation, the control means 9 may operate to initiate a forwarding of information related to the intended and/or ongoing automated active control by the (stabilized) activation signal 16, 27 to other systems of the host-vehicle 2 and/or other vehicles 3, 4.

The embodiments of the invention are discussed with reference to the exemplary traffic situation 1 depicted in FIG. 1 and an adaptive cruise control system. Nevertheless it is to be noted that the invention is applicable also for an adaptive driving assistance system not limited to detecting moving objects in front of the host vehicle and predicting a behavior thereof, but which may also be related to detecting and predicting moving objects in an area rearward of the host vehicle. For an example, an automatic cruise control may execute lane change maneuvers to give way to faster vehicles approaching from behind. The invention may be implemented with any other kind of driving assistant applicable to predictions exceeding cruise control, such as parking assistants, and assistant functionalities to be developed in the future also requiring consistent behaviour generation of decisions for active driving control of vehicles.

While the invention has been described in relation to its preferred embodiments, it is to be understood that this description is intended non-limiting and for illustrative purposes only. In particular, various combinations of features, wherein the features have been described separately hereinbefore, are apparent as advantageous or appropriate to the man skilled in the art. Accordingly, it is intended that the invention be limited by the scope of the appended claims.

The invention claimed is:

1. A method for a driver assistance system for a vehicle, the vehicle comprising at least one sensor means, at least one actuating means and a control means, the method comprising steps of:
   generating a decision signal by a first evaluation of sensor data acquired by the sensor means;
   generating an activation signal for the actuating means when the decision signal exceeds a signal threshold, wherein the activation signal performs an active driving control of the vehicle by the actuating means;
   generating an interrupt decision signal based on a second evaluation;
   stabilizing the activation signal in a temporal manner for preventing the activation signal from fluctuating;
   deciding based on the decision interrupt signal if to interrupt the stabilizing of the activation signal; and
   interrupting the stabilizing of the activation signal, when it is decided to interrupt stabilizing the activation signal.

2. The method according to claim 1, wherein the decision signal is temporally filtered with a low-pass filter.

3. The method according to claim 1, wherein the activation signal is generated based on the decision signal taking a hysteresis into account.

4. The method according to claim 1, wherein the activation signal is maintained for a predetermined time when the decision signal returns to a value below the signal threshold.

5. The method according to claim 1, wherein stabilizing the activation signal in a temporal manner comprises stabilizing the activation signal for a predetermined time.

6. The method according to claim 1, wherein the second evaluation comprises evaluating of one or more parameters, the parameters comprising at least one vehicle indicator and/or at least one environment indicator and/or at least one further vehicle indicator to generate the interrupt decision signal.

7. The method according to claim 1, wherein the signal threshold is predetermined.

8. The method according to claim 1, wherein the signal threshold is determined dynamically based on the sensor data and/or an internal state of the vehicle.

9. The method according to claim 1, wherein the decision interrupt signal comprises a lane change signal for a further vehicle.

10. The method according to claim 9, wherein the lane change signal for the further vehicle is issued before the further vehicle changes a lane.

11. The method according to claim 1, wherein the activation signal is a brake signal.

12. A computer program product embodied in a non-transitory computer-readable medium and encoding instructions for a driver assistance system for a vehicle, the vehicle comprising at least one sensor means, at least one actuating means, and a control means, that when executed on hardware, performs a process, the process comprising:
   generating a decision signal by a first evaluation of sensor data acquired by the sensor means;
   generating an activation signal for the actuating means when the decision signal exceeds a signal threshold, wherein the activation signal performs an active driving control of the vehicle via the actuating means;
   generating an interrupt decision signal based on a second evaluation;
   stabilizing the activation signal in a temporal manner for preventing the activation signal from fluctuating;
   deciding based on the decision interrupt signal if to interrupt the stabilizing of the activation signal; and
   interrupting the stabilizing of the activation signal, when it is decided to interrupt stabilizing the activation signal.

13. A driver assistance system for controlling a vehicle, the driver assistance system comprising:
   at least one sensor means configured to acquire sensor data;
   at least one actuating means configured to perform a control action for the vehicle; and
   a control means, the control means comprising:
   first evaluation means configured to generate a decision signal from the sensor data acquired by the sensor means;
   activation decision means configured to generate an activation signal for the control action when the decision signal exceeds a signal threshold, wherein the activation signal performs an active driving control of the vehicle by an actuating means of the vehicle;
   second evaluation means configured to generate an interrupt decision signal;
   stabilization means configured to stabilize the activation signal in a temporal manner, and prevent the activation signal from fluctuating; and
   interrupt decision means configured to decide based on the decision interrupt signal whether to interrupt the stabilizing of the activation signal;
   wherein the stabilization means is configured to interrupt the stabilizing the of activation signal when it is decided to interrupt stabilizing the activation signal.

14. The system according to claim 13, wherein the control means comprises filter means configured to temporally filter the decision signal with a low-pass filter.

15. The system according to claim 13, wherein the control means is configured to stabilize the activation signal taking a hysteresis into account.

16. The system according to claim 13, wherein the activation means is configured to maintain the stabilized activation signal for a predetermined time when the decision signal returns to a value below the signal threshold.

17. The system according to claim 13, wherein the activation means is configured to stabilize the activation signal in a temporal manner by stabilizing the activation signal for a predetermined time.

18. The system according to claim 13, wherein the system or the method is included in an adaptive cruise control system.

19. The system according to claim 13, wherein the second evaluation means is configured to evaluate one or more parameters, the parameter comprising at least one vehicle indicator and/or at least one environment indicator and/or at least one further vehicle indicator to generate the interrupt decision signal.

20. The system according to claim 13, wherein the second evaluation comprises evaluating input data comprising the sensor data based on a classification algorithm,
   wherein the classification algorithm comprises a support-vector-machine algorithm or a nearest-neighbour-classifier algorithm.

21. The system according to claim 13, wherein the first evaluation comprises generating the decision signal based on context-based prediction.

* * * * *